(12) United States Patent
Alling

(10) Patent No.: US 6,679,703 B2
(45) Date of Patent: Jan. 20, 2004

(54) VIRTUAL TRAINING

(75) Inventor: Eric R. Alling, Upton, MA (US)

(73) Assignee: Shipley Company, L.L.C., Marlborough, MA (US)

( * ) Notice: Subject to any disclaimer, the term of this patent is extended or adjusted under 35 U.S.C. 154(b) by 27 days.

(21) Appl. No.: 10/003,909

(22) Filed: Nov. 1, 2001

(65) Prior Publication Data

US 2002/0051962 A1 May 2, 2002

Related U.S. Application Data

(60) Provisional application No. 60/244,842, filed on Nov. 1, 2000.

(51) Int. Cl.$^7$ .............................................. G09B 19/00
(52) U.S. Cl. ...................................................... 434/219
(58) Field of Search ................................ 434/219–234, 434/322, 323, 350, 362, 236

(56) References Cited

U.S. PATENT DOCUMENTS

| 5,882,206 A | * 3/1999 | Gillio .......................... 434/262 |
| 6,370,355 B1 | * 4/2002 | Ceretta et al. ............... 434/350 |
| 2001/0044728 A1 | * 11/2001 | Freeman et al. ................ 705/1 |

OTHER PUBLICATIONS

Networking's the only way to get ahead. (Apr. 18, 1999). Scotland on Sunday. Scotsman Publications.*
(May 17, 1999). Chesapeake First to Resell vLab, Innovative Online Training Tool for Cisco Equipment. Business Wire.*
Long, G., & Stevenson, K. (Oct. 1, 1999). Real–time network training meets business demands. Computer Dealer News, p. 29.*
Hankins, M. (Jan., 2000), Distance Learning Providers Do Their Own Homework. Signal, pp. 23–26. AFCEA.*
Hankins, M. (Jan., 2000). Virtual Testing Capabilities Enable Professional Certification Process. Signal, p. 26. AFCEA.*
(Mar. 3, 2000). What is CNA? Clarkson University Campus Information Services.*
(Aug. 8, 2000). Cisco help for varsity. The Press; Christchurch, New Zealand.*
Bernold, L., Lloyd, J., & Vouk, M. (No Date). Equipment Operator Training in the Age of Internet2. Construction Automation & Robotics Laboratory, North Carolina State University.*

* cited by examiner

Primary Examiner—John Edmund Rovnak
(74) Attorney, Agent, or Firm—Anne Davis Barry; S. Matthew Cairns

(57) ABSTRACT

A system and method for providing training in a technical field to a student is provided and includes at least one educational institution that provides an educational program. Also included is at least one industry education provider that provides a training program in a technical field. An online education provider is also included wherein the online education provider is in communications with the at least one educational institution and the at least one industry education provider. The online education provider provides to the student a composite educational program including the educational program and the training program in said technical field.

16 Claims, 3 Drawing Sheets

VIRTUAL TRAINING

This application claims the benefit of U.S. Provisional Application No.: Application No. 60/244,842 filed Nov. 1, 2000.

BACKGROUND

The following invention relates to a method and system for providing training and, in particular, to a method and system for providing remote training in a technical field.

Education and training in technical skills has become increasingly important for workers to succeed in today's environment. Typically, workers acquire technical skills by attending educational institutions that offer degree programs in various technical disciplines such as chemistry, computer science and electrical engineering. Employers often require that an employee complete a degree program in a relevant field as a prerequisite to employment.

University degree programs, however, while adequate at providing a student with a basic foundation in a particular technical field, generally do not provide the specialized skills the student requires to perform in industry. For example, while a student may learn the technical principles of chemistry and electrical engineering underlying the operation of computer chip manufacturing, universities typically do not have the resources to provide students with hands on experience in coating photoresist and imaging on silicon wafers used to make the computer chips. Because universities are not equipped to train students in such specialized skill areas, workers have to learn these skills on the job, at the expense of the employer.

The emergence of the Internet has given rise to a growing number of online educational institutions including eCollege, (http://www.ecollege.com/) and Virtual Online University, (http://www.vousi.com/). These online educational institutions typically provide students with a variety of courses and degree programs in various technical disciplines that may include courses offered by "brick and mortar" universities and college. Thus, online educational institutions enable students to acquire education and training in technical disciplines from any Internet-enabled device.

Although online educational institutions make training in technical skills broadly available, they suffer from the same drawback as their "brick and mortar" counterparts in that they don't have the resources to provide students with the hands-on or interactive training, practical training in specialized technical fields.

Accordingly, it is desirable to provide a way in which students can receive practical training in technical fields that is not offered by educational institutions.

SUMMARY OF THE INVENTION

The present invention is directed at overcoming the drawbacks of the prior art. Under the present invention a system and method for providing training in a technical field to a student is provided and includes at least one educational institution that provides an educational program. Also included is at least one industry education provider that provides a training program in a technical field. An online education provider is also included wherein the online education provider is in communications with the at least one educational institution and the at least one industry education provider. The online education provider provides to the student a composite educational program including the educational program and the training program in said technical field.

In an exemplary embodiment, the student communicates with the online education provider via the Internet for receiving the composite educational program.

In an exemplary embodiment, the industry education provider includes equipment for teaching a technical skill in the technical field and the composite educational program includes access to the equipment for teaching the technical skill.

In an exemplary embodiment, a control module is included and is in communications with said equipment for controlling the equipment. The control module provides at least one exercise associated with the technical skill using the equipment and the composite educational program includes the at least one exercise.

Accordingly, a method and system is provided in which students can receive education in a particular subject area from an educational institution and also receive practical training in a related technical field not otherwise offered by such educational institution.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
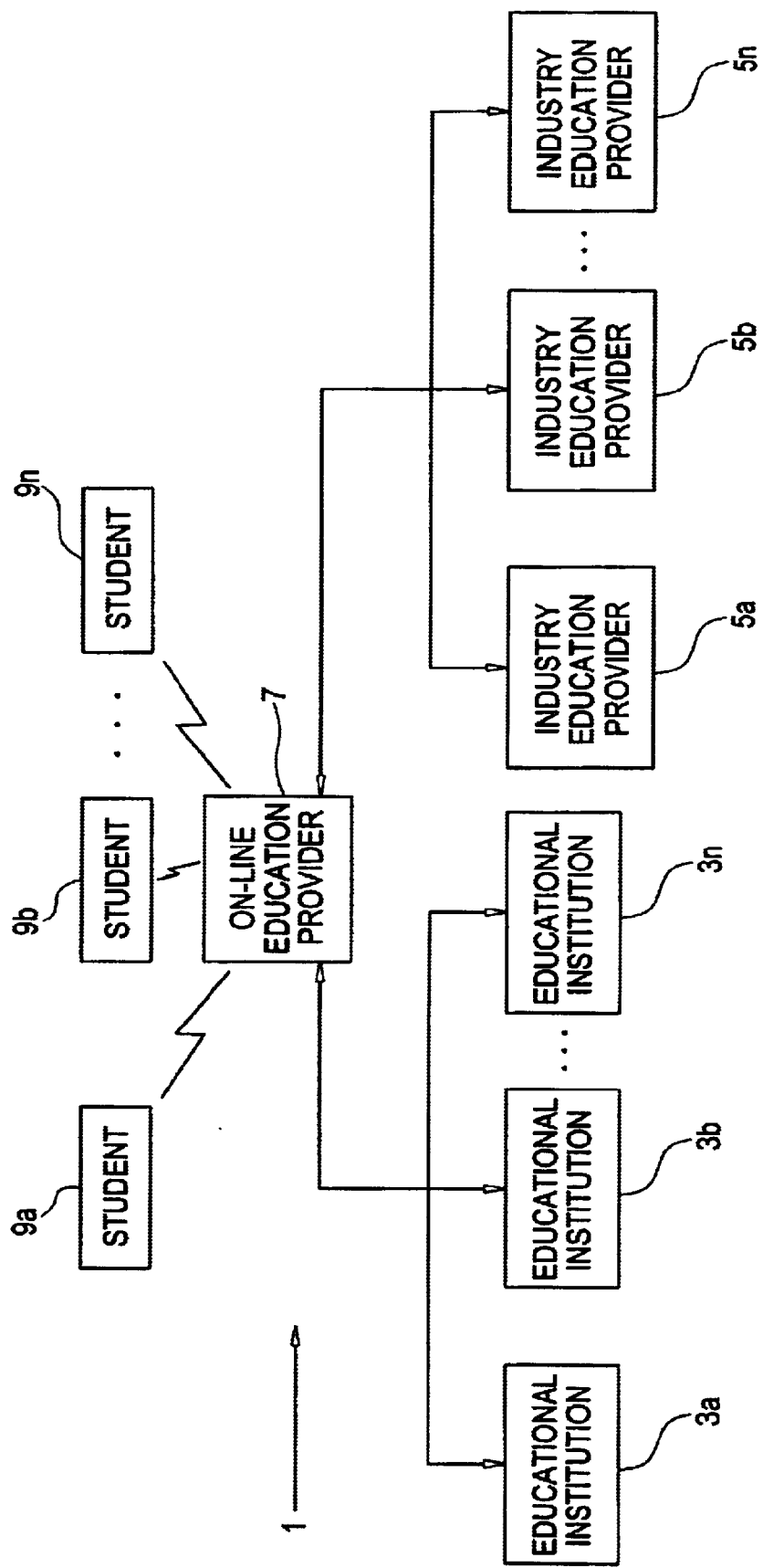
FIG. 1 is a block diagram of the online educational system of the present invention.

Referring now to FIG. 1, there is shown an online educational system 1 of the present invention. System 1 aggregates educational and training materials from multiple sources so that a student using educational system 1 is provided with abroad and specialized educational experience. To that end, system 1 includes at least one educational institution 3 that provides educational materials on a variety of subject areas. For example, educational institution 3 may be a university that offers numerous courses organized into degree programs covering various disciplines such as chemistry, computer science and electrical engineering. In an exemplary embodiment, educational institution 3 offers these educational materials through system 1 via the Internet. System 1 may also include a plurality of educational institutions 3 each one offering educational materials through system 1.

Also included in system 1 is at least one industry educational provider 5. Industry educational provider 5 is an entity that has highly specialized and practical knowledge in a particular skill. For example, industry educational provider 5 may be a company that develops manufacturing equipment, materials or processes used in computer chip manufacturing and therefore has hands-on experience in coating silicon wafers with photoresist. Industry educational provider 5 has materials such as, by way of non-limiting example, written materials, audio, photographs and video, that embody the knowledge and experience of industry educational provider 5 and that can be used to impart that knowledge on others. In addition, industry education provider 5 has the necessary equipment to practice its highly specialized skill set. Industry educational provider may have, for example, a coating track machine that it uses to spin and index wafers used for computer chips. Generally, industry educational provider 5 has practical knowledge of a specialized skill set not typically available from educational institution 3.

System 1 also includes an online education provider 7 that is in communications with educational institution 3 and industry educational provider 5. The communications between online education provider 7, educational institution 3 and industry educational provider 5 may be via the Internet or any other communications medium including, but not limited to, leased lines, cable or broadcast. Any of a plurality of students 9 may communicate with online education provider 7 via the Internet or by any other suitable manner including, but not limited to, leased lines, cable or broadcast.

Figure 2:
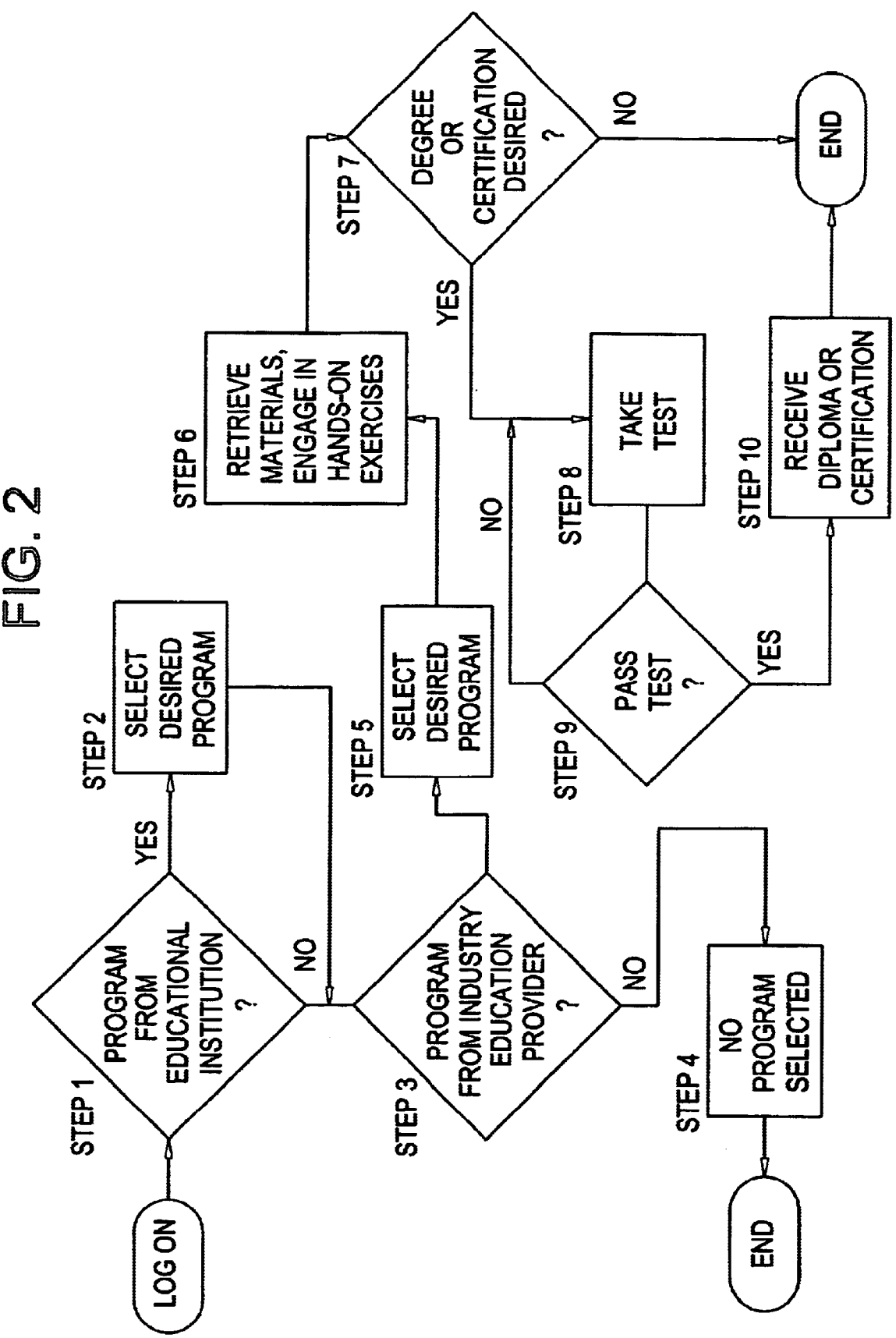
FIG. 2 is a flowchart of the operation of the online education provider included in the online educational system of FIG. 1.

Referring now to FIG. 2, there is shown a flowchart of the operation of online education provider 7. Initially, students 9 log on to online education provider 7 and are asked, in Step 1, whether they want to participate in a educational program from one of educational institutions 3. If a particular student wants to participate in a educational program from one of educational institutions 3, then the student selects the desired program in Step 2. If the student does not want to participate in a educational program from one of educational institutions 3, then in Step 3, the student is asked whether the student wants to participate in a program from one of industry education providers 5. If the student does not want to participate in a program from one of industry education providers 5, then if the student did not select a program from one of educational institutions 3, then the method ends at Step 4 because the student did not select any study program. In Step 5, the student selects a desired study program from one of industry education providers 5 and proceeds to Step 6 at which point the students studies the program materials and engages in industry specialized and/or "hands-on" exercises. In Step 7, the student is asked whether the student wants a degree or certification indicating that the student mastered the selected education program. If so, then in Step 8, the student's knowledge of the program is tested and, if the student passes the test, a degree or certification is granted in Step 10.

Thus, online education provider 7 presents to students 9 the educational materials offered by educational institution 3 and industry educational provider 5 and enables students 9 to construct a custom composite educational program by selecting courses and programs from any of educational institutions 3 and industry education providers 5. In addition, online education provider 7 offers to students 9 pre-selected composite educational programs that includes educational materials from any of educational institutions 3 and industry education providers 5. Furthermore, upon completion of any of these composite educational programs, the student may receive diploma or certificate from some or all of the educational institutions 3 and industry education providers 5 that contributed materials towards the particular composite educational program.

As an example of how students 9 may interact with online education provider 7, a particular student 9a may select to engage in a particular course of study, for example chemistry, that is offered by educational institution 3. In addition, student 9a may have interest in a particular chemical specialty relating to silicon wafer manufacturing. To supplement the chemistry curriculum provided by educational institution 3, student 9a would also select through online education provider 7 a course from industry educational provider 5 that focuses on computer chip manufacturing. This course may include lecture materials, audio, photographs, video, as well "hands-on" wafer processing experience. In addition, student 9a may pose questions regarding the materials to industry education provider 5 via online education provider 7 for further clarification of the materials. Student 9a may also replay and review the materials presented through online education provider 7. Thus, by interacting with online education provider 7, student 9a receives a foundation in chemistry from educational institution 3 as well as the specialized, practical knowledge regarding a specific chemistry related topic provided by industry educational provider 5.

Alternatively, student 9a may desire to learn a particular technical specialty to improve the student's job skills. In this case, student 9a would select through online education provider 7 a course from industry educational provider 5 that deals with the desired technical specialty. Student 9a may also, through online education provider 7, select a course or courses from educational institution 3 in order to get a theoretical understanding of the field associated with the technical specialty.

Figure 3:
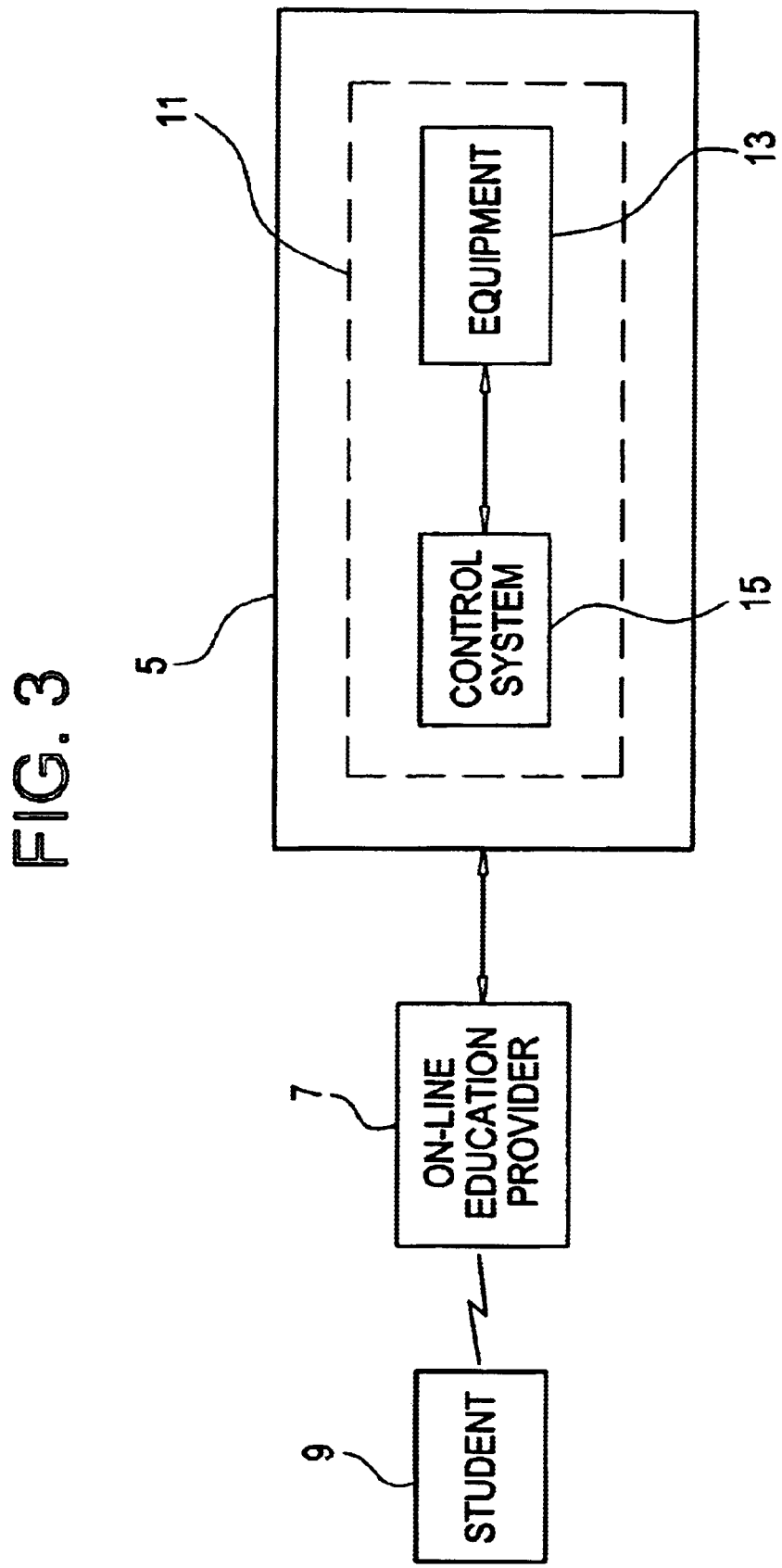
FIG. 3 is shown a block diagram of the industry educational provider included in the online educational system of FIG. 1.

Referring now to FIG. 3, there is shown a block diagram of industry educational provider 5 showing a remote lab facility 11 for providing students with "hands-on" interaction experience in accordance with the present invention. Remote lab facility 11 includes equipment 13 used by industry educational provider 5 to produce a product or provide a service. For instance, equipment 13 may be a coating track machine used to spin and index silicon wafers used for wafer processing in computer chip manufacturing. Generally, equipment 13 may be any device for which industry educational provider 5 has the specialized skills to operate including, by way of non-limiting example, manufacturing equipment, chemical processing equipment, robotic systems and simulation systems.

Remote lab facility 11 also includes a control module 15 in communications with equipment 13 that controls the operation of equipment 13. Control module 15 is designed so that students 9 can manipulate control module 15 for the purpose of leaning about, experimenting with and operating equipment 13. So, for example, control module 15 may initiate the operation of equipment 13 and allow students 9 to view such operation via video cameras (not shown) located adjacent equipment 13. Alternatively, control module 15 may allow students 9 themselves to operate equipment 13. For equipment that is complex and difficult to operate, control module 15 may guide students 9 through their operation of equipment 13 thereby facilitating the learning process. Also, control module 15 may limit student control of equipment 13 to certain operations so that the equipment is protected from improper operation. Thus, by presenting students 9 with various exercises involving the use of equipment 13, industry educational provider 5 provides students 9 with practical, hand-on technical experience that educational institutions 3 cannot generally provide.

Accordingly, a method and system is provided in which students can receive education in a particular subject area from an educational institution and also receive practical training in a related technical field not otherwise offered by such educational institution.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A system for providing virtual training, the system comprising:
   a network;
   an on-line education provider host system in communication with the network, said host system including instructions for performing a method to provide on-line education, the method comprising:
      communicating via the network with an educational institution, wherein said educational institution provides an educational program via said network;
      communicating via the network with an industry education provider, wherein:
         said industry education provider provides a training program in a technical field via said network;
         said training program includes access to manufacturing equipment via said network for teaching a technical skill in said technical field; and
         said equipment provides a service or produces a product in said technical field;
      forming a composite educational program from said educational program and said training program; and
   communicating via the network with a student to provide said composite educational program to said student.

2. The system of claim 1, wherein said network is the Internet.

3. The system of claim 1, wherein when said student completes said composite educational program, said student is given a certification from said educational institution.

4. The system of claim 1, wherein when said student completes said composite educational program, said student is given a certification from said industry education provider.

5. The system of claim 1, wherein when said student completes said composite educational program, said student is given a certification from said online education provider.

6. The system of claim 1, wherein:
   said training program further includes access to a control module in communication with said equipment for controlling said equipment;
   said access to said equipment is through said control module; and
   said control module provides an exercise associated with said technical skill using said equipment.

7. The system of claim 1, wherein said training program includes materials selected from the group of written materials, audio, photographs and video.

8. A system for remotely training a student in a technical skill, comprising:
   manufacturing equipment for teaching said technical skill;
   a control module, said control module in communications with said equipment for controlling said equipment, said control module being remotely accessible by said student and providing said student with at least one exercise associated with said technical skill using said equipment.

9. A method for providing virtual training, the method comprising:
   communicating via a network with an educational institution, wherein said educational institution provides an educational program via said network;
   communicating via the network with an industry education provider, wherein:
      said industry education provider provides a training program in a technical field via said network;
      said training program includes access to manufacturing equipment via said network for teaching a technical skill in said technical field; and
   said equipment provides a service or produces a product in said technical field; forming a composite educational program from said educational program and said training program; and
   communicating via the network with a student to provide said composite educational program to said student.

10. The method of claim 9, wherein said network is the Internet.

11. The method of claim 9, further comprising the step of:
   giving a certification to said student upon completion of said composite educational program by said student.

12. The method of claim 9, wherein:
   said training program further includes access to a control module in communication with said equipment for controlling said equipment;
   said access to said equipment is through said control module; and
   said control module provides an exorcise associated with said technical skill using said equipment.

13. The method of claim 9, wherein said training program includes materials selected from the group of written materials, audio, photographs and video.

14. The system of claim 1 wherein said equipment includes chemical processing equipment.

15. The system of claim 1 wherein said equipment includes robotic systems.

16. The system of claim 1 wherein said equipment includes simulation systems.

\* \* \* \* \*